United States Patent [19]

Yamawaki et al.

[11] Patent Number: 5,202,370
[45] Date of Patent: Apr. 13, 1993

[54] BUTENE-1 COPOLYMER COMPOSITION

[75] Inventors: Takashi Yamawaki; Nobumasa Kita, both of Ichihara, Japan

[73] Assignees: Idemitsu Petrochemical Co., Ltd., Tokyo, Japan; Neste Oy, Finland

[21] Appl. No.: 870,220

[22] Filed: Apr. 20, 1992

Related U.S. Application Data

[63] Continuation of Ser. No. 629,166, Dec. 19, 1990, abandoned, which is a continuation of Ser. No. 218,395, Jul. 13, 1988, abandoned.

[30] Foreign Application Priority Data

Jul. 14, 1987 [JP] Japan ............................ 62-175311

[51] Int. Cl.$^5$ .................................................. C08J 3/10
[52] U.S. Cl. .................................. 524/436; 524/434; 524/437
[58] Field of Search .................. 524/436, 437, 434

[56] References Cited

U.S. PATENT DOCUMENTS 3,956,212  5/1976  Sakaguchi et al. ............ 260/23

FOREIGN PATENT DOCUMENTS 0131358  1/1985  European Pat. Off. ............ 524/436
0207734  1/1987  European Pat. Off. .
2263361  10/1973 Fed. Rep. of Germany .
57-10898  3/1982  Japan .
58-137858  1/1983  Japan .
59-210963  11/1984 Japan .

OTHER PUBLICATIONS

Patent Abstracts of Japan, vol. 3, No. 109 (C-58), Sep. 12, 1979; & JP-A-54 85 293 (Mitsuit Sekiyu Kagaku Kogyo K.K.) Jul. 6, 1979 *Abstract*.

Primary Examiner—Joseph L. Schofer
Assistant Examiner—Peter D. Mulcahy
Attorney, Agent, or Firm—Armstrong, Westerman, Hattori, McLeland & Naughton

[57] ABSTRACT

This invention relates to a butene-1 copolymer composition suitable as a wire coating material which is superior in flame retardance and even if it burns, no toxic gas is generated and superior in mechanical strengths, chacterized by comprising 20–55% by weight of a butene-1 copolymer containing 80–99 mol % of butene-1 unit and 1–20% of α-olefin unit having at least 5 carbon atoms and having an intrinsic viscosity $[\eta]$ of 1.0–7.0 dl/g measured in decalin at 135° C. and a maximum melting point of 80°–120° C. measured by differential scanning calorimetric analysis and 80–45% by weight of an inorganic metal hydroxide and/or an inorganic metal hydrate which have an average particle size of 0.05–6 m.

5 Claims, No Drawings

BUTENE-1 COPOLYMER COMPOSITION

This application is a continuation of application Ser. No. 629,166 filed Dec. 19, 1990, now abandoned, which is a continuation of application Ser. No. 218,395 filed Jul. 13, 1988 now abandoned.

BACKGROUND OF THE INVENTION

1. Field of the Invention

This invention relates to a novel butene-1 copolymer composition. More particularly, it relates to a butene-1 copolymer composition which is superior in flame retardancy and emits no toxic gas even if it burns and superior in mechanical strength and is suitable as materials for wire coating.

2. Description of the Related Art

Crystalline butene-1 copolymers have been positively developed in their uses because of their superior creep characteristics, high strength against distortion and high heat resistance. However, the butene-1 copolymers also have the defect of easy flammability like other polyolefins.

Hitherto, flame-retardation of thermoplastic resins has been made by adding a halogen compound as a flame-retardant to thermoplastic resins. However, such thermoplastic resins containing a halogen compound emit toxic gas when burning.

In order to solve this problem, adding magnesium hydroxide and carbon powder to thermoplastic resins in place of the halogen compound has been proposed. (See Japanese Patent Kokoku No. 57-10898). This publication discloses polybutene-1 as an example of thermoplastic resins.

However, when said materials are applied to ordinary polybutene-1 such as butene-1 homopolymer, flame-retardancy can be improved, but reduction in mechanical characteristics is recognized and thus this method is not satifactory.

Furthermore, a composition of polybutene-1 in which magnesium hydroxide and a modified polyolefin are incorporated has been proposed. (See Japanese Patent Kokai No. 59-210963). This composition also suffers from the problem of insufficient mechanical properties.

SUMMARY OF THE INVENTION

An object of this invention is to provide a butene-1 copolymer composition which is superior in flame-retardancy and emits no toxic gas when burning and besides is superior in tensile characteristics such as elongation.

Another object of this invention is to provide a butene-1 copolymer composition suitable as wire coating materials.

The inventors have found that the above objects can be accomplished by combination of a specific butene-1 copolymer selected as thermoplastic resin with a specific inorganic metal hydroxide and the like.

That is, this invention is a butene-1 copolymer composition, characterized by comprising 20–55% by weight of a butene-1 copolymer which contains 80–99 mol % of butene-1 unit and 1–20 mol % of α-olefin unit of at least 5 carbon atoms and has an intrinsic visosity $[\eta]$ of 1.0–7.0 dl/g measured in decalin at 135° C. and a maximum melting point of 80°–120° C. measured by differential scanning calorimetric analysis and 80–45% by weight of an inorganic metal hydroxide and/or an inorganic metal hydrate having an average particle size of 0.05–6 μm.

DESCRIPTION OF THE PREFERRED EMBODIMENT

The butene-1 copolymer composition of this invention contains a specific butene-1 copolymer comprising butene-1 unit and α-olefin unit of at least 5 carbon atoms.

Content of butene-1 unit in the butene-1 copolymer is 80–99 mol %.

Content of α-olefin unit of 5 or more carbon atoms in the butene-1 copolymer is 1–20 mol %.

By taking such composition, the butene-1 copolymer shows crystal form of form II (tetragonal system). If content of α-olefin unit of at least 5 carbon atoms in the butene-1 copolymer is less than 1 mol % (namely, content of butene-1 unit is more than 99 mol %), when melt of the butene-1 copolymer solidifies, the crystal form transforms from form II (tetragonal system) to form I (hexagonal system) and so mechanical strength of the composition abruptly decreases with increase of amount of inorganic metal hydroxide or inorganic metal hydrate referred to hereinafter. Moreover, if content of the α-olefin unit is more than 20 mol % (namely, content of butene-1 unit is less than 80 mol %), butene-1 copolymer shows no crystallinity.

In this invention, it is especially preferred that content of butene-1 unit in the butene-1 copolymer is 85–99 mol % and that of α-olefin is 1–15 mol %.

By employing these ranges, crystal transformation of butene-1 copolymer becomes difficult to occur and besides crystallinity is increased, resulting in remarkable increase in mechanical strength of the butene-1 copolymer composition.

The α-olefin unit of at least 5 carbon atoms (preferably 5–11 carbon atoms) in the butene-1 copolymer in this invention includes, for example, hexene-1 unit, 4-methyl-pentene-1 unit, octene-1 unit and decene-1 unit. Among them, hexene-1 unit is preferred.

Intrinsic viscosity $[\eta]$ of the butene-1 copolymer used in this invention measured in decalin solution at 135° C. is 1.0–7.0 dl/g. This intrinsic viscosity $[\eta]$ affects mainly moldability and mechanical strength of butene-1 copolymer.

When intrinsic viscosity $[\eta]$ is lower than 1.0 dl/g, mechanical strength, especially impact resistance of molded products produced using the copolymer decreases. When higher than 7.0 dl/g, moldability decreases. Especially, mechanical strength of molded products and moldability of the butene-1 copolymer composition become much satisfactory by employing the intrinsic viscosity $[\eta]$ of 1.3–4.5 dl/g, preferably 1.5–3.5 dl/g.

The above butene-1 copolymer has a maximum melting point of 80°–120° C., preferably 85°–115° C. measured by a differential scanning calorimetric analysis device (DSC). In this invention, the maximum melting point means a peak which appears on the most high temperature side when a dry treated butene-1 copolymer is heated from 0° C. to 200° C. at a heating rate of 10° C./min and its endothermic peak is measured.

When the maximum melting point is lower than 80° C., the copolymer becomes tacky at room temperature and cannot be used as molding materials. When the maximum melting point is higher than 120° C., the butene-1 copolymer composition is much deteriorated in its moldability.

It is preferred that blocking property (X) of α-olefin of the butene-1 copolymer measured by nuclear magnetic resonance spectrum analysis is within a specific range.

The blocking property of α-olefin is measured in the following manner: That is, $^{13}$C-NMR spectrum of butene-1 copolymer is measured and from the results of measurement each triad is identified by the method disclosed in "Macromolecules", 15, 353 (1982), whereby blocking property (X) of α-olefin in main chain of butene-1 copolymer can be measured from the following formula.

$$X = I/H$$

wherein I is block polymerization amount of α-olefin chain in copolymer and is normally expressed by the following formula:

$$I \text{ (mol \%)} = \frac{ICH_2(HH)}{ICH_3(BH)} \times 100$$

wherein ICH$_2$(HH) indicates intensity of —CH$_2$— belonging to main chain measured from nuclear magnetic resonance spectrum of a separately prepared polyolefin and ICH$_2$(BH) indicates intensity of —CH$_2$— belonging to main chain of butene-1 -α-olefin unit chain or hexane-unit-olefin unit.

H is a content of α-olefin in the copolymer and is normally expressed by the following formula:

$$H \text{ (mol \%)} = \frac{IBr(H)}{IBr(B) + IBr(H)} \times 100$$

wherein $I_{Br}$(H) indicates intensity of chain including all sequences based on α-olefin unit, which are —H—H—H—, —B—H—H—, —B—H—B— and the like if α-olefin unit is indicated by [H] and butene-1 units is indicated by [B].

$I_{Br}$(B) indicates intensity of chain including all sequences based on butene-1 unit such as, for example, —B—B—B—, —B—B—H— and —H—B—H—.

The blocking property (X) of α-olefin in the butene-1 copolymer in this invention is preferably 0.005 or less. Especially, in this invention, a butene-1 copolymer containing hexene-1 as α-olefin which has a blocking property (X) of 0.005 or less can be used advantageously.

The butene-1 copolymer in this invention can be easily prepared, for example, by vapor phase reaction of a specific α-olefin with butene-1 using a specific solid catalyst component containing magnesium represented by the following formulas, organoaluminum compound and a specific electron donating compound as catalyst.

wherein R$^1$ and R$^2$ each represents an alkyl group and m and n satisfy $0 \leq m \leq 2$ and $0 \leq n \leq 2$.

Specifically, it can be prepared by the processes disclosed in, for example, Japanese Patent Application Nos. 61-144093, 61-196265, 61-196266 and 61-1967222 with experimentarily setting preparation conditions based on said characteristics of the butene-1 copolymer in this invention.

A process for preparation of the butene-1 copolymer used in this invention will be explained below along the lines indicated in Japanese Patent Application No. 61-196266.

The copolymer can be easily prepared by reaction butene-1 with a specific α-olefin under vapor phase polymerization conditions in the presence of a catalyst comprising a solid catalyst component (A), an organoaluminum compound (B) and an electron donating compound (C) explained below.

The solid catalyst component (A) can be prepared by chlorinating at least one organomagnesium compound shown by the following formula with at least one chlorinating agent to obtain a carrier and contacting this carrier with a halide of tetravalent titanium in the presence of an electron donor at $-25°$ C.$-+180°$ C.

Formula: 

wherein R$^1$ and R$^2$ each denotes an alkyl group of 1-20 carbon atoms and they may be identical or different.

As said organomagnesium compounds, mention may be made of, for example, alkylmagnesium compounds such as diethylmagnesium, ethylbutylmagnesium, ethylhexylmagnesium, ethyloctylmagnesium, dibutylmagnesium, butylhexylmagnesium, butyloctylmagnesium and dicyclohexylmagnesium.

The chlorinating agent includes, for example, chlorine gas and alkyl chlorides. It is preferred in this invention to use chlorine gas and butyl chloride in combination.

The chlorination is carried out usually at $0°$-$100°$ C. (preferably $20°$-$60°$ C., especially preferably $20°$-$40°$ C.).

This chlorination causes substitution of chlorine atom for a part of alkyl group bonding to magnesium atom. Since at least a part of alkyl group remains, formation of normal crystal latice is inhibited by the action of this remaining alkyl group, resulting in production of non-layered product of very small crystal grain size having suitable surface area and pore volume.

The resulting non-layered product is, if necessary, subjected to alcohol treatment and then treated with a halide of tetravalent titanium in the presence of an electron donor. The treatment with halide of tetravalent titanium is usually effected at $-25°$ C.$-+180°$ C.

The halides of tetravalent titanium include, for example, titanium tetrahalides, alkoxytitanium trihalides, alkoxytitanium dihalides and trialkoxytitanium monohalides. In this invention, titanium tetrachloride is especially preferred.

As the electron donor, there may be used organic compounds containing oxygen, nitrogen, phosphorus or sulfur.

As examples of the electron donors, mention may be made of amines, amides, ketones, nitriles, phosphines, phosphoramides, ethers, thioethers, thioesters, acid anhydrides, acid halides, acid amides, aldehydes, organic acids and esters.

Among them, preferred are esters, ethers, ketones and acid anhydrides. Specific examples are ethyl benzoate, ethyl p-methoxybenzoate, ethyl p-ethoxybenzoate, methyl toluylate, diisobutyl phthalate, benzoquinone, benzoic anhydride and ethylene glycol butyl ether.

In thus prepared solid catalyst component (A), amount of each ingredient is adjusted so that halogen/titanium (molar ratio) is within 3-200 (preferably 4-100) and magnesium/titanium (molar ratio) is within 1-90 (preferably 5-70).

The organoaluminum compound (B) is not critical, but trialkylaluminum is especially preferred.

As the electron donating compound (C), a heterocyclic compound represented by the following formula (2) can be used.

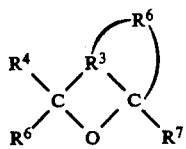

(2)

In the above formula (2), $R^3$ and $R^6$ each represents a hydrocarbon group (preferably a substituted or unsaturated and saturated or unsaturated hydrocarbon group of 1-5 carbon atoms) and $R^4$, $R^5$ and $R^7$ each represents a hydrogen atom or a hydrocarbon group (preferably a substituted or unsubstituted and saturated or unsaturated hydrocarbon group of 2-5 carbon atoms) $R^3$ and $R^6$ may be identical or different and $R^4$, $R^5$ and $R^7$ may be identical or different.

As the heterocyclic compound, mention may be made of, for example, 1,4-cineole, 1,8-cineole, m-cineole, pinol, benzofuran, 2,3-dihydrobenzofuran (coumaran), 2H-chromene, 4H-chromene, chroman, isochroman, dibenzofuran and xanthene. These heterocyclic compounds may be used alone or in combination of two or more.

Among them, 1,8-cineole is especially preferred.

Composition of catalyst for preparation of butene-1 copolymer used in this invention is such that organoaluminum compound (B) is normally within the range of 0.1-1000 times (preferably 1-500 times) the mol of titanium atom in the tetravalent titanium compound in the solid catalyst component (A) and the electron donating compound (C) is within the range of 0.1-500 times (preferably 0.5-200 times) the mol of titanium atom in the tetravalent titanium compound in the solid catalyst component (A).

Temperature for vapor phase polymerization is usually 45°-80° C. (preferably 50°-70° C.).

Pressure for polymerization can be optionally set within the range where substantially no liquefication of the starting materials occur and usually is 1-15 kg/cm$^2$.

Molar ratio of the specific α-olefin and butene-1 introduced can be optionally set within the range of molar ratio of them in the objective copolymer (that is, 1:99-20:80, preferably 1:99-15:85)

Further, a molecular weight modifier such as hydrogen may coexist for adjustment of molecular weight. Furthermore, in order to prevent agglomeration of copolymer, there may coexist an inert gas lower in boiling point than butene-1 (e.g., nitrogen, methane, ethane and propane).

The butene-1 copolymer used in this invention may contain other monomers as far as the above characteristics of the butene-1 copolymer is not damaged.

Content of the butene-1 copolymer in the butene-1 copolymer composition of this invention is 20-55% by weight, preferably 25-50% by weight. When the content is less than 20% by weight, mechanical strengths such as tensile elongation and brittleness at low temperature are decreased and when more than 55% by weight, flame retardancy cannot be imparted.

The butene-1 copolymer composition of this invention contains a specific inorganic metal hydroxide and/or inorganic metal hydrate in an amount of 80-45% by weight, preferably 75-50% by weight.

The inorganic metal hydroxides include hydroxides of divalent or trivalent metals and specific examples thereof are magnesium hydroxide, aluminum hydroxide and calcium hydroxide. The inorganic metal hydrates include hydrates of divalent or trivalent metals and specific examples thereof are $2MgO.6SiO_23H_2O$, $Al_2O_3.9SiO.3H_2O$, $Al_2O_3. 3H_2O$ and hydrated calcium silicate.

In this invention, the above inorganic metal hydroxide and inorganic metal hydrate can be used independently or in combination. Further, the inorganic metal hydroxide can be used alone or in combination of two or more. Similarly, the inorganic metal hydrate can be used alone or in combination of two or more.

Especially preferred inorganic metal hydroxides are magnesium hydroxide and aluminum hydroxide.

In this invention, the inorganic metal hydroxide and inorganic metal hydrate have an average particle size of 0.05-6 μm.

Particles of less than 0.05 μm in average particle size form secondary agglomerate at mixing with butene-1 copolymer, resulting in decrease in tensile elongation of butene-1 copolymer composition. When particles of more than 6 μm are used, flame retardance of butene-1 copolymer composition decreases.

In this invention, both characteristics of mechanical strength such as tensile strength and flame retardancy are much improved especially by using the inorganic metal hydroxide and/or inorganic metal hydrate having an average particle size ranging from 0.1 to 5 μm.

Furthermore, this butene-1 copolymer composition may contain carbon black as a third component. Addition of the carbon black can further improve the flame retardancy of the butene-1 copolymer composition.

As the carbon black, there may be used any of those which are prepared by furnace process such as furnace black, thermal black, acetylene black and black and by impingement process such as channel black and naphthalene black.

Carbon black of 1-300 mμ, especially 5-120 mμ is especially preferred from the viewpoints of improvement of flame retardancy, operability and uniform kneadability.

In this case, amount of carbon black added is preferably 6 parts by weight or less (especially preferably 0.2-4 parts by weight) for 100 parts by weight of total amount of the butene-1 copolymer and the inorganic metal hydroxide and/or inorganic metal hydrate. When carbon black is added in an amount of more than 6 parts by weight, elongation sometimes decreases.

Furthermore, as far as attainment of the object of this invention is not obstructed, this butene-1 copolymer composition may further contain antioxidants such as hindered phenol type, phosphorus type (such as phosphites and phosphates) and amine type antioxidants, ultraviolet absorbers such as benzotriazole type and benzophenone type, external lubricants such as aliphatic carboxylic acid ester type and paraffinic type, customary flame retarders, releasing agents, antistatic agents and colorants. As the hindered phenol type antioxidants, normal ones such as BHT (2,6-di-t-butyl-p-cresol) can be used.

In addition, inorganic fillers and organic fillers can also be incorporated as required.

As the inorganic fillers, mention may be made of, for example, carbonates such as calcium carbonate, magnesium carbonate and dolomite, sulfates such as calcium sulfate and magnesium sulfate, sulfites such as calcium sulfite, silicates such as talc, clay, mica, asbestos, glass fiber, glass beads, calcium silicate, montmorillonite and bentonite, metal powders such as iron, zinc and aluminum, ceramics such as silicon carbide and silicon nitride and fibrous materials thereof. These inorganic fillers are used alone or in combination of two or more.

The inorganic fillers may be any of particulate, plate and fibrous forms. Preferred are those of 0.2–20 μm in average particle size.

It is also possible to add a rubber-like elastomeric resin within the range where characteristics of the butene-1 copolymer composition of this invention are not damaged. The rubber-like elastomeric resins include, for example, copolymers of α-olefins of 4 or less carbon atoms with butene-1.

As examples of the rubber-like elastomeric resins, mention may be made of ethylene-propylene rubber, ethylene-propylene-non-conjugated diene rubber, ethylene-1-butene rubber, ethylene-isobutylene rubber, polyisobutylene, ethylene-isobutylene rubber, polybutadiene, styrene-butadiene rubber, atactic polypropylene, MAS copolymer, MBS copolymer, MABS copolymer and mixtures thereof. Among these rubber-like elasomers, ethylene-propylene rubber and ethylene-propylene-non-conjugated diene rubber are preferred.

The butene-1 copolymer composition of this invention may further contain copolymers of α-olefins of 4 or less carbon atoms and modified polyolefins such as maleic acid modified polyethylene.

The butene-1 copolymer composition of this invention can be produced, for example, by the following processes.

That is, (1) a process of dry blending the components and then kneading the mixture, for example, by a twin-screw kneader, (2) a process introducing all of the components into Banbury mixer and kneading them and (3) a process of previously preparing a master batch and incorporating and kneading other components therewith.

The thus produced butene-1 copolymer composition of this invention can be molded by known methods such as extrusion molding, coextrusion molding, injection molding, air-pressure molding and die molding.

The butene-1 copolymer composition of this invention is superior in flame retardance and even if it burns, no toxic gas is generated. Therefore, the composition of this invention can be suitably used as coating materials for wires such as communication cable transmission lines which are required to be superior in both the flame retardance and mechanical characteristics. Furthermore, the composition is superior in tensile characteristics and brittleness at low temperatures and so is suitable as coating materials for wires used in a cold district. Further, the butene-1 copolymer composition of this invention can be molded into a sheet or a film and be used in this form.

According to this invention, since a specific butene-1 copolymer containing butene-1 unit and a specific α-olefin unit is blended with an inorganic metal hydroxide and/or inorganic metal hydrate at a specific ratio, the resulting composition is excellent in flame retardance and besides, even if it burns, no toxic gas is generated. Further, mechanical strengths such as tensile strength are not decreased and the mechanical strengths are superior in a wide range.

Therefore, the butene-1 copolymer composition of this invention can be effectively used, for example, as materials for coating electric wires which are required to be at high levels in characteristics such as flame retardance and mechanical strength.

This invention will be explained by the following examples and comparative examples.

PREPARATION EXAMPLES 1-3

(1) Preparation of solid catalyst component (A)

300 ml of butyloctylmagnesium (20% heptane solution) was charged in a five necked flask provided with a mechanical stirrer, a reflux condenser, dropping funnel, a gas feeding valve and a thermometer. Nitrogen was introduced into the flask and inert atmosphere was kept therein. Then, 5 ml of butyl chloride was added through the dropping funnel and then chlorine gas was added at a rate of 5 ml/min to perform chlorination.

Thereafter, 2.5 l of silicone oil was added at 25°–35° C. and to the resulting mixture was further added dropwise 113 ml of ethanol. The addition of ethanol resulted in precipitation of chlorination product produced. The mixture containing the precipitate was stirred at 40° C. for 1 hour and then heated to 75°–80° C. and the solution was allowed to stand at this temperature overnight.

This solution of high temperature was gently added to a solution cooled to −25° C. and containing diisobutyl phthalate (electron donor) and excess amount of TiCl$_4$ by a syphon, thereby to precipitate a reaction intermediate product in this TiCl$_4$ of low temperature. Then, this mixed solution containing the precipitate was heated to room temperature.

Then, diisobutyl phthalate as an electron donor was further added to the mixed solution containing precipitate and temperature was elevated to 100°–110° C. and the mixed solution was kept at this temperature for 1 hour. The reaction product was allowed to settle and washed with heptane of 85° C. 5–6 times and the solution was transferred to other vessel by syphon.

To this solution was further added an excess amount of TiCl$_4$ and the resulting mixture was stirred at 110° C. for 1 hour. The resulting precipitate and solution were separated by syphon and then the resulting catalyst component (precipitate) was washed with heptane several times (5–6 times at 80° C.).

The resulting precipitate was collected and dried under low vacuum. Thus, solid catalyst component (A) containing 3.0% by weight of Ti was obtained.

(2) Preparation of catalyst

The solid catalyst component (A) obtained in the above (1) was introduced into a catalyst preparation tank so as to get a titanium concentration of 2 mmols in 1 liter. Into this catalyst preparation tank were introduced 30 mmols/liter of triisobutylaluminum and 12 mmols/liter of 1,8-cineole. Thereafter, propylene was introduced thereinto in an amount of 50 g for 1 mmol of titanium atom and temperature inside the catalyst preparation tank was elevated to 40° C. to carry out reaction for preparation of catalyst.

(3) Production of butene-1 copolymer

Into a fluidized bed polymerizer of 300 mm in diameter and 100 liters in capacity were introduced the Ti catalyst slurry reprepared from the catalyst obtained in the above (2) to a concentration of 3.6 mmols/liter in terms of Ti atom at a flow rate of 0.15 liter/hour from the catalyst preparation tank, triisobutylaluminum at a flow rate of 30 mmols/hour and 1,8-cineole at 24 mmols/hour.

Thereto were fed butene-1, hexene-1, hydrogen gas and nitrogen gas with adjusting partial pressure of butene-1 to 3 kg/cm², that of nitrogen to 4 kg/cm² and that of hydrogen so that intrinsic viscosity of the resulting polymer reached the values as shown in Table 1 at a gas feeding rate of 35 cm/sec and polymerization was effected at a reaction temperature of 60° C.

TABLE 1

|  | Preparation Example | | |
|---|---|---|---|
|  | 1 | 2 | 3 |
| Hexene-1 unit (mol %) | 7.2 | 10.3 | 6.8 |
| [η] (dl/g) | 2.14 | 2.33 | 0.70 |
| DSC maximum melting point (°C.) | 106.2 | 103.8 | 107.3 |
| Blocking property of hexene-1 unit | 0.001 | 0.003 | 0.001 |

Measurement methods of the above values are as follows.

Intrinsic viscosity [η]:
This was measured in decalin at 135° C.

DSC maximum melting point:
The resulting butene-1 copolymer was dried and used as a sample. This sample was heated from 0° C. to 200° C. at a heating rate of 10° C./min and endothermic peak was measured.

Blocking property of hexene-1:
$^{13}C$ nuclear magnetic resonance spectrum of the resulting butene-1 copolymer was measured and from the results of measurement each triad was identified by the method disclosed in the "Macromolecules" referred to before and the blocking property was calculated from the following formula referred to before:

$X = I/H$

EXAMPLES 1-11 AND COMPARATIVE EXAMPLES 1-7

The butene-1 copolymer prepared in the Preparation Examples 1-3, butene-1 homopolymer (DP-0200 supplied by Shell Co., U.S.A.) or butene-1-ethylene copolymer (DP-8010 supplied by Shell Co., U.S.A.) and magnesium hydroxide or aluminum hydroxide and furnace black (carbon black) were mixed at the ratios as shown in Table 2 and molten and kneaded to produce pellets of butene-1 copolymer compositions.

In preparation of the pellets, an antioxidant (Irganox 1010 supplied by Ciba Geigy Co.) was added in an amount of 1000 ppm for the composition.

Oxygen index and tensile properties of the resulting compositions were measured in the following manner.

Oxygen index:
The composition was press molded into a sheet of 3 mm thick. This sheet was cut into 6 mm × 3 mm × 150 mm and oxygen index was measured in accordance with JIS-K-7201.

Tensile properites:
The above mentioned pellets were molded into a plate of 2 mm thick by the same method as above. After the press molding, the plate was stored at 23° C. for 10 days and then JIS dummbell No. 2 was blanked therefrom and tensile strength and elongation were measured at a tensile rate of 100 mm/min by a tensile strength tester.

TABLE 2

| | Composition | | | | | | Properties | | |
|---|---|---|---|---|---|---|---|---|---|
| | Butene-1 copolymer | | Inorganic metal hydroxide | | | Others | | | Tensile characteristics |
| | Kind | Amount (Part by weight) | Kind | Average particle size (μm) | Amount (Part by weight) | Kind | Amount (Part by weight) | Oxygen index | Tensile strength (kg/cm²) | Elongation (%) |
| Ex. 1 | Prep. Ex. 1 | 30 | Mg(OH)₂ | 0.4 | 70 | — | — | 34 | 107 | 230 |
| Ex. 2 | Prep. Ex. 1 | 40 | Mg(OH)₂ | 0.4 | 60 | — | — | 32 | 154 | 320 |
| Ex. 3 | Prep. Ex. 1 | 50 | Mg(OH)₂ | 0.4 | 50 | — | — | 30 | 206 | 380 |
| Ex. 4 | Prep. Ex. 1 | 40 | Mg(OH)₂ | 3.0 | 60 | — | — | 31 | 175 | 370 |
| Ex. 5 | Prep. Ex. 1 | 40 | Al(OH)₃ | 0.4 | 60 | — | — | 32 | 142 | 250 |
| Co. Ex. 1 | DP-0200 | 40 | Mg(OH)₂ | 0.4 | 60 | — | — | 30 | 115 | 6 |
| Co. Ex. 2 | DP-8010 | 40 | Mg(OH)₂ | 0.4 | 60 | — | — | 30 | 70 | 35 |
| Co. Ex. 3 | Prep. Ex. 3 | 40 | Mg(OH)₂ | 0.4 | 60 | — | — | 30 | 45 | 3 |
| Co. Ex. 4 | Prep. Ex. 1 | 10 | Mg(OH)₂ | 0.4 | 90 | — | — | 37 | 30 | 1 |
| Co. Ex. 5 | Prep. Ex. 1 | 60 | Mg(OH)₂ | 0.4 | 40 | — | — | 28 | 184 | 350 |
| Co. Ex. 6 | Prep. Ex. 1 | 40 | Mg(OH)₂ | 7.0 | 60 | — | — | 27 | 190 | 380 |
| Co. Ex. 7 | Prep. Ex. 1 | 40 | Al(OH)₃ | 10.0 | 60 | — | — | 28 | 194 | 360 |
| Ex. 6 | Prep. Ex. 2 | 30 | Mg(OH)₂ | 0.4 | 70 | — | — | 33 | 104 | 210 |
| Ex. 7 | Prep. Ex. 2 | 50 | Mg(OH)₂ | 0.4 | 50 | — | — | 30 | 223 | 350 |
| Ex. 8 | Prep. Ex. 1 | 30 | Mg(OH)₂ | 0.4 | 70 | Furnace Black | 2 | 38 | 112 | 220 |
| Ex. 9 | Prep. Ex. 1 | 40 | Mg(OH)₂ | 0.4 | 60 | Furnace Black | 2 | 34 | 147 | 330 |
| Ex. 10 | Prep. Ex. 1 | 50 | Mg(OH)₂ | 0.4 | 50 | Furnace Black | 2 | 32 | 205 | 370 |
| Ex. 11 | Prep. Ex. 2 | 40 | Mg(OH)₂ | 0.4 | 60 | DP-8010 | 10 | 30 | 167 | 260 |

What is claimed is:

1. A butene-1 copolymer composition consisting essentially of 20-55% by weight of a butene-1 copolymer containing 80-99 mol % of a butene-1 unit and 1-20 mol % of α-olefin unit having at least 5 carbon atoms, and having an intrinsic viscosity [η] of 1.0-7.0 dl/g measured in decalin at 135° C., a maximum melting point of 80°-120° C. measured by differential scanning calorimetric analysis and a blocking property of the α-olefin unit measured by nuclear magnetic resonance spectrum analysis of 0.005 or less; and 80–45% by weight of an inorganic metal hydoxide or an inorganic metal hydrate having an average particle size of 0.05–6 μm.

2. A composition according to claim 1 wherein the α-olefin unit having at least 5 carbon atoms is a hexene-1 unit.

3. A composition according to claim 1 wherein the butene-1 copolymer has a maximum melting point of 85°–115° C. measured by differential scanning calorimetric analysis device (DSC).

4. A composition according to claim 1 wherein the inorganic metal hydroxide is at least one compound selected from the group consisting of magnesium hydroxide and aluminum hydroxide.

5. A composition according to claim 1 wherein the inorganic metal hydroxide or hydrate has an average particle size of 0.1–5 μm.

* * * * *